United States Patent
Lewis, II et al.

(10) Patent No.: US 6,276,300 B1
(45) Date of Patent: Aug. 21, 2001

(54) ANIMAL LITTER

(75) Inventors: Ronald A. Lewis, II, St. Louis; Phillip Green, Jackson; Charmaine C. Bebiak, Villa Ridge; Cyndy Bolte, New Haven, all of MO (US)

(73) Assignee: Ralston Purina Company, St. Louis, MO (US)

( * ) Notice: Subject to any disclaimer, the term of this patent is extended or adjusted under 35 U.S.C. 154(b) by 0 days.

(21) Appl. No.: 09/461,785

(22) Filed: Dec. 15, 1999

Related U.S. Application Data

(60) Provisional application No. 60/112,875, filed on Dec. 18, 1998.

(51) Int. Cl.$^7$ .................................................. A01K 29/00
(52) U.S. Cl. ............................................................. 119/172
(58) Field of Search ..................................... 119/171, 172, 119/173

(56) References Cited

U.S. PATENT DOCUMENTS

| | | |
|---|---|---|
| D. 364,945 | 12/1995 | Smothers et al. . |
| 2,665,259 | 1/1954 | Buffett . |
| 2,728,733 | 12/1955 | Hashimoto . |
| 3,080,214 | 3/1963 | Duke et al. . |
| 3,278,040 | 10/1966 | Goldberg et al. . |
| 4,163,674 | 8/1979 | Been . |
| 4,203,388 | 5/1980 | Cortigene et al. . |
| 4,278,047 | 7/1981 | Luca . |
| 4,342,858 | 8/1982 | Herman et al. . |
| 4,570,573 | 2/1986 | Lohman . |
| 4,657,881 | 4/1987 | Crampton et al. . |
| 4,671,209 | 6/1987 | Whittlestone et al. . |
| 4,676,196 * | 6/1987 | Lojek et al. ..................... 119/171 |
| 5,014,650 | 5/1991 | Sowle et al. . |
| 5,044,324 * | 9/1991 | Morgan et al. ..................... 119/171 |
| 5,080,046 | 1/1992 | Cassone . |
| 5,109,805 | 5/1992 | Baldry et al. . |
| 5,193,489 | 3/1993 | Hardin . |
| 5,209,185 | 5/1993 | Chikazawa . |
| 5,210,980 | 5/1993 | Phillips . |
| 5,216,980 | 6/1993 | Kiebke . |
| 5,287,826 | 2/1994 | Mohamed . |
| 6,092,302 * | 7/2000 | Berrigan ..................... 34/303 |

FOREIGN PATENT DOCUMENTS

| | | |
|---|---|---|
| 0115898 | 8/1984 | (EP) . |
| 0169946 | 2/1986 | (EP) . |

OTHER PUBLICATIONS

Literature Search Prepared by Ralston Purina for U.S. Patents for Dog Waste Collection Devices (Scoops, etc.), dated Jan., 1998.

Literature Search Prepared by Ralston Office Services, by William E. Campbell, Articles on Dogs, dated Apr., 1997.

Electronic Search on (Canine) Dog Litter Boxes, Litter Scoops.

Literature Search Prepared by Ralston Office Services, by Alan M. Beck, Artticles on Dogs, dated Apr., 1997.

* cited by examiner

Primary Examiner—Thomas Price
(74) Attorney, Agent, or Firm—Armstrong Teasdale LLP

(57) ABSTRACT

A litter composition including paper, sawdust, and zeolite molecular sieve is described. The composition is formed into pellets or discs having a size, soil-like consistency, and texture which is believed to be attractive to dogs. In addition, the litter has a high degree of absorption and odor control. The litter composition may further include sphagnum moss to provide additional absorbency.

22 Claims, 4 Drawing Sheets

ANIMAL LITTER

CROSS REFERENCE TO RELATED APPLICATION

This application claims the benefit of U.S. Provisional Application No. 60/112,875, filed Dec. 18, 1998.

FIELD OF THE INVENTION

This invention relates generally to animal litters, and more particularly, to an animal litter composition which is attractive to dogs.

BACKGROUND OF THE INVENTION

Animal litters of various compositions are commonly used for the control and removal of animal waste. The most well-known litter compositions are sold by retailers for the control of cat waste, and are widely used by cat owners. In contrast, dog owners typically do not use litter, but instead train the dog to use discarded newspapers, or to go outside. This usually involves the unpleasant task of removing the waste by rolling up soiled newspapers, or scooping waste from the ground. Control of dog waste in such a manner is a particular annoyance for dog owners who travel frequently with their dogs. The availability of suitable outdoor space while traveling is often very limited, and indoor space, for example in hotels, is often restricted and does not include suitable places for spreading newspapers.

Known cat litter compositions are fabricated primarily from one of four materials: clay; vegetable matter such as grass, hay or alfalfa; wood chips, shavings or sawdust; and paper, such as shredded, flaked or pelletized paper. While such compositions are not strictly limited to cats and are readily commercially available, they are relatively unattractive to dog owners. For example, the high density of clay litters make them heavy and awkward to carry in the larger quantities required by dog owners. In addition, clay is not readily biodegradable, and proper disposal is inconvenient, requiring dog owners to handle large quantities of heavy, soiled litter. Clay litters are also especially prone to produce dust, and tracking out by the animal. Grass, hay or alfalfa based litters are less dense than clay and are biodegradable, but are highly susceptible to bacterial and mold growth, and generally produce odors offensive to people and that seem to be offensive to animals. The various wood-based litters are also lightweight, but have a wood scent believed to be unattractive to most animals, are highly susceptible to tracking, and also lack absorbency. Generally, the known litters lack the consistency and texture of soil, which dogs seem to prefer.

Known paper-based litters address some of the limitations of the other known litter compositions. Shredded, flaked or pelletized paper litters are lightweight, absorbent, and not highly susceptible to bacterial and mold growth. However, shredded and flaked paper litters do not have a soil-like consistency, particularly after getting soaked, and are highly susceptible to tracking. In addition, known paper-based litters have a limited ability to control odor, and have limited absorbency, which is a particular problem for owners of large dogs.

Accordingly, it would be desirable to provide a paper-based litter which has the consistency and texture of soil and is absorbent. Further, it would be desirable to provide such a litter at a low manufacturing cost. In addition, it would be desirable to provide a litter with the ability to control odor. It would be still further desirable to provide such a litter with a consistency which can be easily molded into pellets of various shapes and sizes, to reduce tracking of the litter.

SUMMARY OF THE INVENTION

These and other objects may be attained by an absorbent litter composition formed into pellets or discs and including an absorbent material such as paper. The litter composition also includes sawdust and zeolite molecular sieve. The pellets or discs have a soil-like consistency, size, and texture which is believed to be attractive to dogs. An additional absorbent material, such as sphagnum moss, may be included in the litter composition to increase the absorbency. An antimicrobial agent, as well as a scenting agent, may also be added to the litter composition.

The litter is generally manufactured by shredding paper and mixing the paper with sawdust and zeolite molecular sieve. The additional absorbent material may then be added to the mixture After thoroughly mixing the mixture, the litter composition is extruded into the desired shape, e.g., pellets or discs. Additional agents such as fragrances, anti-microbial agents, and eating deterrents are then applied to the litter before the litter is weighed and packaged.

In use, the composition is contained in a suitable litter container, pan, or box. A suitable litter container is of a size chosen to accommodate the size of a particular pet. The soiled litter is removed with a scoop, shovel, or rake such as those commonly used in cleaning cat litter pans. Soiled litter may be disposed of in litter disposal bags or other suitable disposable bags. New litter is added to the pan to keep the litter at a certain level in the pan.

It is believed that the high degree of odor control and absorbency provided by the combination of paper, sawdust, and zeolite molecular sieve, plus the use of an attractive scent, make the litter composition highly attractive to dogs. In addition, the inclusion of an additional absorbent material make the litter composition even more absorbent. It is further believed that house training puppies and dogs will be facilitated with use of the litter composition.

The litter composition provides a highly absorbent, yet inexpensive litter composition which is particularly suitable for dogs. The litter composition has a low manufacturing cost, and a suitable consistency for easy molding into pellets or discs of various shapes and sizes.

DETAILED DESCRIPTION

The animal litter composition is a paper-based composition that includes paper, sawdust, and zeolite molecular sieve. The paper can be any kind of paper such as, for example, recycled paper. In one embodiment, recycled newspaper is used because of its wide availability and low cost. Zeolite molecular sieve, available from WAY Zeolite is included in the litter composition for odor absorbency. An additional absorbent material may be added to the composition to increase the absorbency of the litter. For example, the litter composition may include sphagnum moss which is available from Johnson & Johnson, Co., New Brunswick, N.J. Sphagnum moss is a high grade moss that has a very high absorbency rate. The absorbency is due to a multitude of interconnected cavities in the leaves that communicate with the ambient environment.

In one embodiment, the litter composition includes about 30% to about 95% by volume newspaper; about 1% to about 50% by volume absorbent material; about 1% to about 10% by volume zeolite molecular sieve; and about 3% to about 50% sawdust. An exemplary formulation of the litter composition includes about 45% to about 50% by volume newspaper; about 20% to about 25% by volume sphagnum moss; about 20% to about 25% by volume sawdust; and about 2% to about 5% by volume zeolite molecular sieve.

Figure 1:
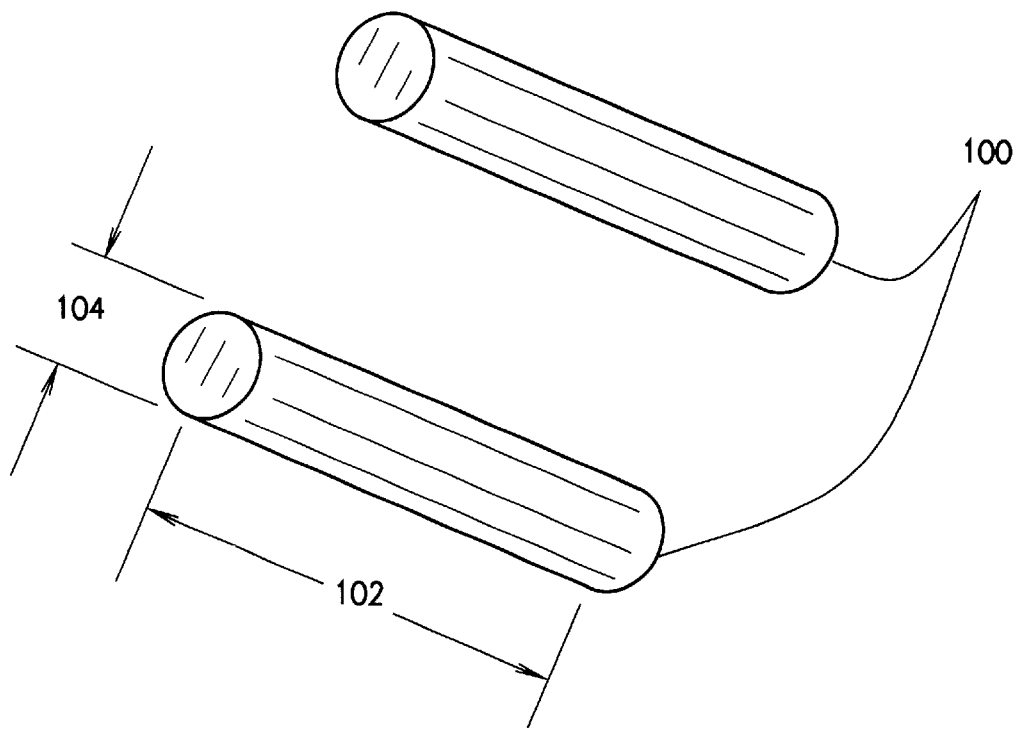
FIG. 1 is a perspective view of one embodiment of animal litter according to the present invention.

FIG. 1 illustrates a pellet 100 of dog litter according to one embodiment of the present invention. Litter pellets 100 generally have a cylindrical shape. Pellets 100 have a length 102 between about 0.25 inches and about 2.0 inches and a diameter 104 between about 0.25 inches and about 0.75 inches. Specifically, pellets 100 have a diameter 104 of about 0.33 inches.

Figure 2:
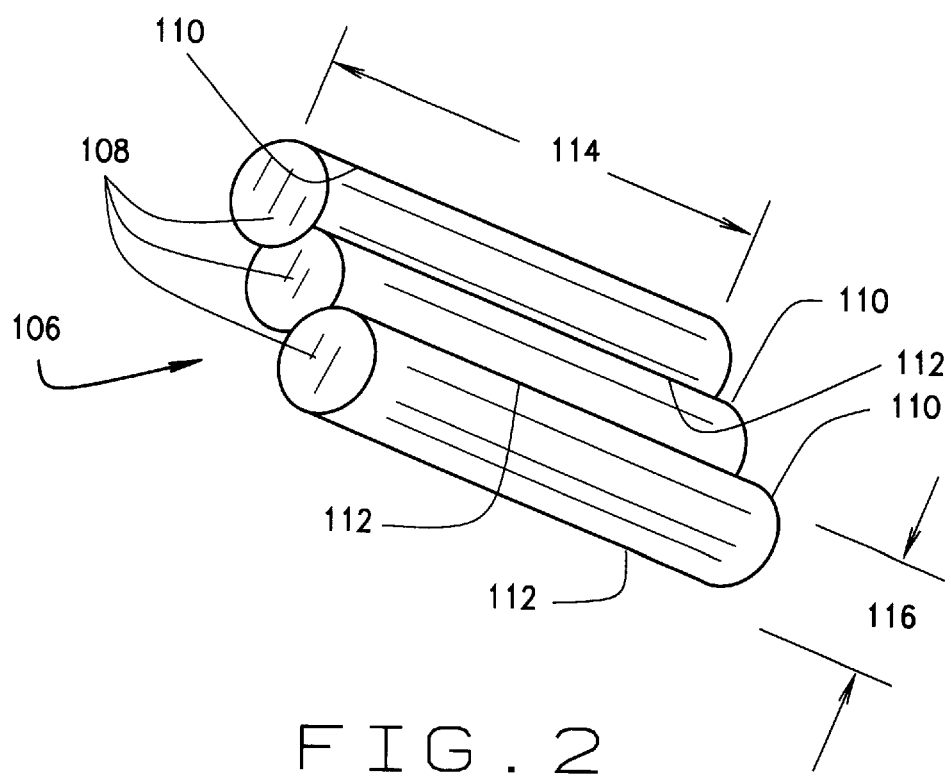
FIG. 2 is a perspective view of an alternative embodiment of the animal litter.

FIG. 2 illustrates an alternative pellet 106 of dog litter. Pellet 106 includes three cylindrical shaped members 108 fused together. Each member 108 includes a first side 110 and a second side 112. Members 108 are fused together such that first side 110 of one member 108 is fused to second side 112 of a second member 108. Members 108 generally have a length 114 between about 0.25 inches and about 2.0 inches and a diameter 116 between about 0.25 inches and about 0.75 inches. Specifically, pellets 100 have a diameter 114 of about 0.33 inches.

Figure 3:
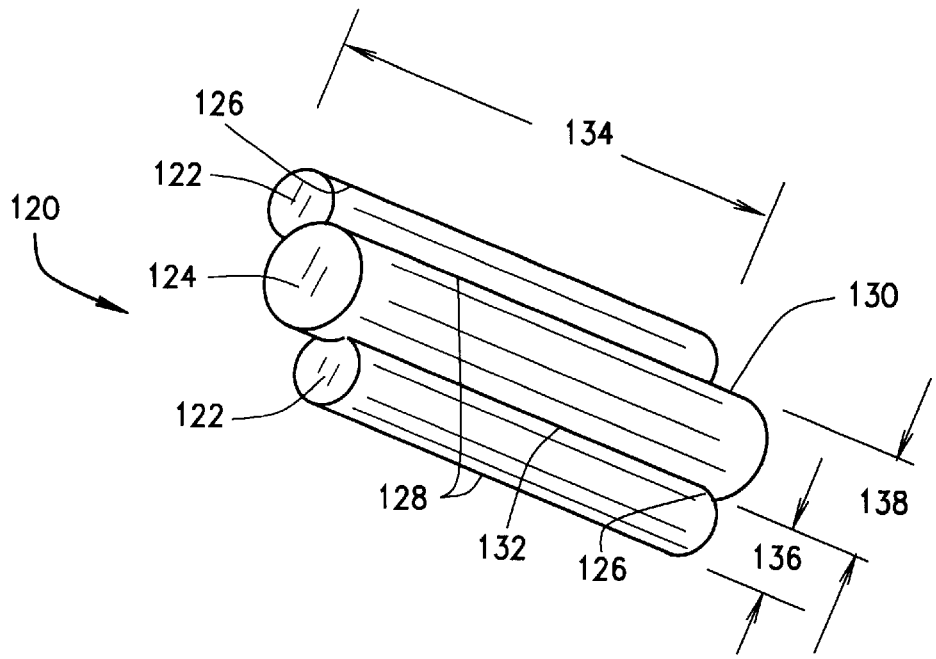
FIG. 3 is a perspective view of another alternative embodiment of the animal litter.

FIG. 3 illustrates an alternative pellet 120 including a pair of small outer members 122 fused to a larger inner member 124. Outer members 122 include a first side 126 and a second side 128 and inner member 124 includes a first side 130 and a second side 132. First side 126 of one of outer members 122 is fused to second side 132 of inner member 124 and second side 128 of the other of outer members 122 is fused to first side 130 of inner member 124. Members 122 and 124 generally have a length 134 between about 0.25 inches and about 2.0 inches. Members 122 have a diameter 136 between about 0.33 inches and about 0.375 inches, and member 124 has a diameter 138 between about 0.125 inches and about 0.25 inches.

Figure 4:
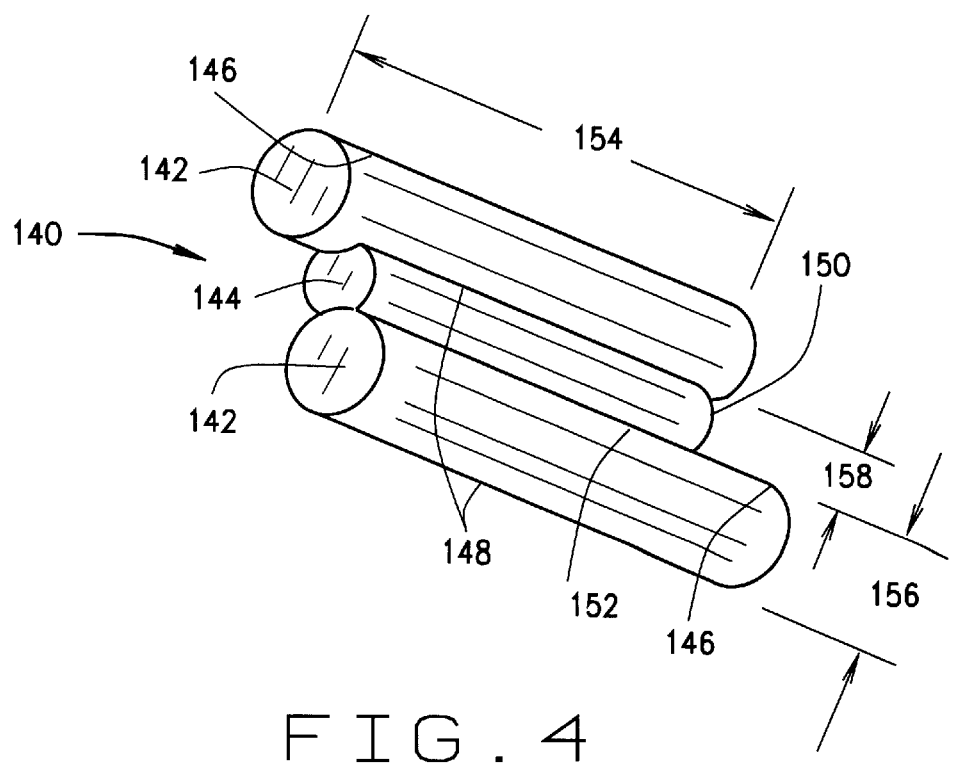
FIG. 4 is a perspective view of a further alternative embodiment of the animal litter.

FIG. 4 illustrates an alternative pellet 140 including a pair of large outer members 142 fused to a smaller inner member 144. Outer members 142 include a first side 146 and a second side 148 and inner member 144 includes a first side 150 and a second side 152. First side 146 of one of outer members 142 is fused to second side 152 of inner member 144 and second side 148 of the other of outer members 142 is fused to first side 150 of inner member 144. Members 142 and 144 generally have a length 154 between about 0.25 inches and about 2.0 inches. Members 142 have a diameter 156 between about 0.125 inches and about 0.25 inches, and member 144 has a diameter 158 between about 0.33 inches and about 0.375 inches.

Figure 5:
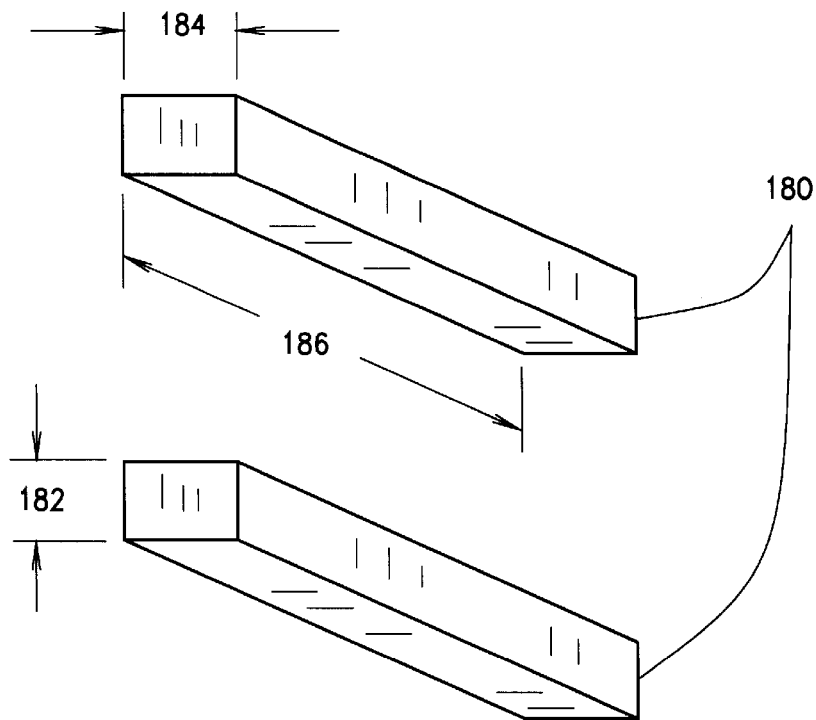
FIG. 5 is a perspective view of a still further alternative embodiment of the animal litter.

FIG. 5 illustrates an alternative pellet 180 having an elongated cube shape. Pellets 180 have a height 182 and a width 184 between about 0.25 inches and about 0.75 inches. Specifically, height 182 and width 184 are about 0.33 inches. In addition, pellets 180 have a length 186 between about 0.25 inches and about 2.0 inches. Alternatively, the litter composition could be formed into pellets having an oval or oblong cross-section.

The bulk density of pellets 100, 110, 120, 140 and 180 is between about 25 lbs/ft$^3$ to about 40 lbs/ft$^3$. Specifically, the bulk density of pellets 100, 110, 120, 140, and 180 is between about 30 lbs/ft$^3$ to about 35 lbs/ft$^3$. The size and density of pellets 100, 110, 120, 140, and 180 are selected to provide a soil-like consistency and texture. Generally, in size-sorting pellets 100 and 180 through a mesh material, about 94% of the pellets should be retained on 4 Mesh and about 4% of the pellets should be retained on 6 Mesh, while less than about 2% should be retained on 10 Mesh and less than about 0.2% on 20 Mesh. In one embodiment, about 80% of the pellets should be over about 1 inch in length to reduce the likelihood that dogs will track the pellets outside of a litter pan.

The litter composition may additionally include agents to serve as olfactory cues, reduce bacterial growth on the litter, and discourage eating of the litter. For example, about 0.05 lbs/ton to about 0.5 lbs/ton of an antimicrobial agent may be included to discourage bacterial growth on the litter. One suitable antimicrobial agent is Myacide, available from Angus Chemical Company.

A fragrance, or scent, may be added to the litter composition to serve as an olfactory cue for dogs since it is believed that certain scents serve as olfactory cues regarding urinating and defecating. Such fragrances are available from Bell Flavors and Fragrances and include clover, spice, woods, earth, fresh outdoors, cut grass, and green grass. Of course, other fragrances may also be used provided the fragrance serves as an olfactory cue for the animal, and is not simply a masking agent for odor. In an exemplary embodiment, about 0.05% to about 0.3% by weight of the litter composition is a fragrance that serves as an olfactory cue for the dogs.

The litter composition may further include an agent that serves to deter dogs from eating the litter. An example of such a deterrent is quinine HCl available from Bell Flavors and Fragrances. In one embodiment, about 1.0% to about 2.0% by weight of the litter composition is quinine HCl. Alternatively, a natural deterrent flavor may be used.

In addition, it may be desirable to add a dedusting agent to the pellets to reduce the amount of dust produced by the pellets. One suitable dedusting agent is polytetrafloraethylene.

Figure 6:
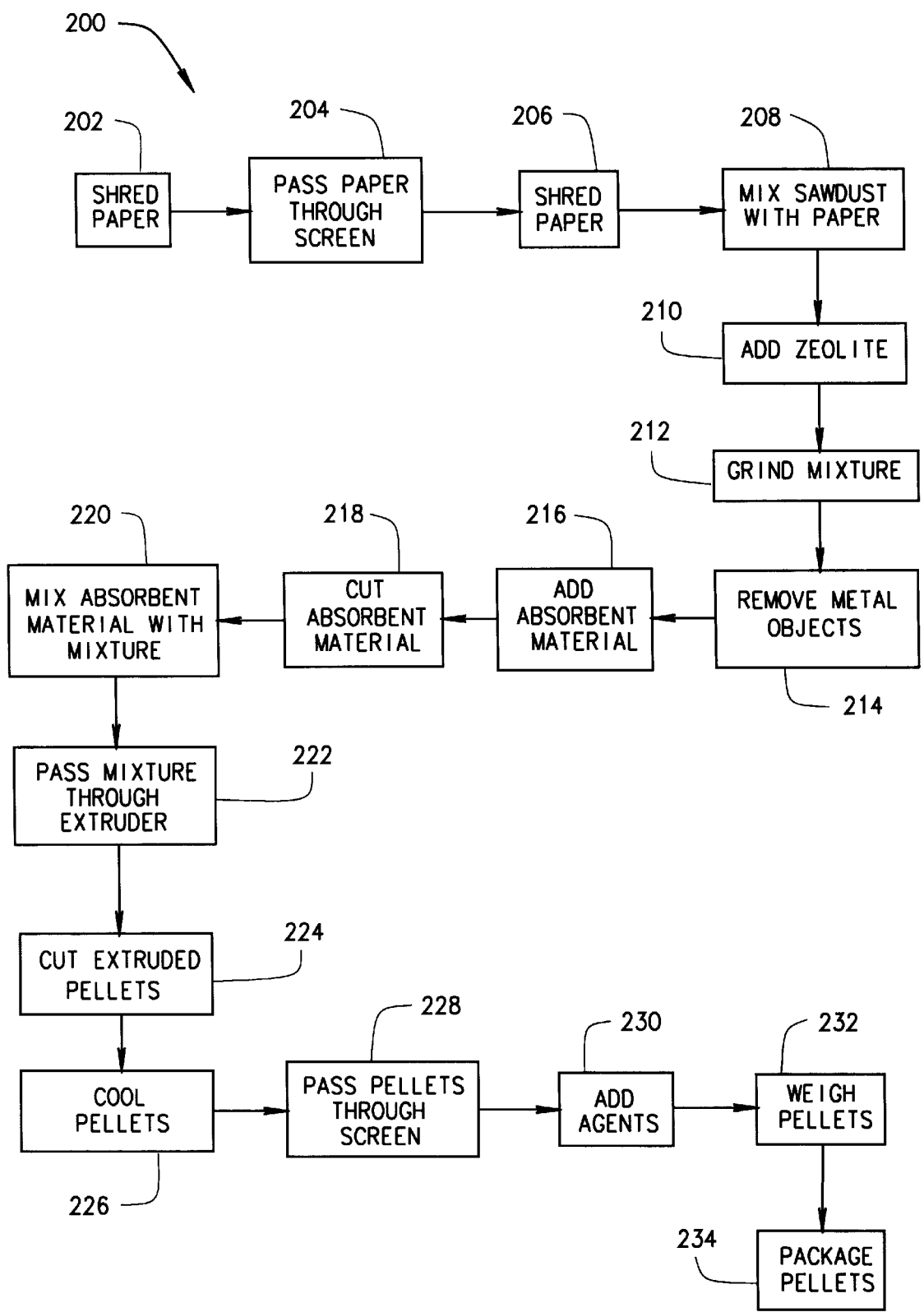
FIG. 6 is a flow diagram of a method for preparing the animal litter.

FIG. 6 is a flow chart 200 illustrating a method for manufacturing pellets 100 (shown in FIG. 1), 110 (shown in FIG. 2), 120 (shown in FIG. 3), 140 (shown in FIG. 4) and 180 (shown in FIG. 5) that includes shredding 202 paper, e.g., bales of recycled paper, with a hammer mill to grind the paper into small pieces. The paper is then passed 204 through a screen to remove large pieces, that may, or may not be paper. The remaining paper is again shredded 206 with a hammer mill. The shredded paper is then sent to a mixer, e.g., a cyclone mixer, where sawdust is mixed 208 with the paper. Zeolite is added 210 to the paper and sawdust mixture in the mixer. The mixture of the paper, zeolite, and sawdust is then passed through a hammer mill to further grind 212 the mixture into small pieces. The mixture is then sent through a magnetic screen to remove 214 metal objects, e.g., staples, from the mixture.

An absorbent material, such as sphagnum moss, is added 216 to the mixture and is subjected to a cutter, e.g., a dicer. The cutter cuts 218 the sphagnum moss into small pieces, e.g., approximately ⅛ inch squares. The sphagnum moss squares are thoroughly mixed 220 with the paper, zeolite, and sawdust mixture in a cyclone mixer. The paper, zeolite, sawdust, and sphagnum moss mixture then passes 222 through a pelletizer extruder which forces the mixture through a die and forms pellets. The extruded pellets are then cut 224 to the appropriate length. As the mixture passes through the extruder, the mixture becomes hot, e.g., about 160° Fahrenheit, from the pressure on the mixture. The extruded pellets are then cooled 226 and passed 228 through a mesh screen which retains pellets of the appropriate size.

The pellets then pass, e.g., on a conveyer, through a spray chamber while fragrances, anti-microbial agents, and/or bitter agents are added 230 to the pellets. Since the pellets are relatively hot while the agents are being sprayed on, they do not need to be dried prior to bagging. However, the pellets could be passed through a drier if the pellets are too moist. The pellets are then weighed 232 on a scale and packaged 234 on a packing line.

The pellets have an absorbency from about 1.5:1 up to about 6.0:1 on a weight basis. Liquid retention is approximately 0.08 on the first treatment and 0.17 on the second treatment. The increase in the second treatment is due to a longer contact time caused, at least in part, by swelling of the pellets. The swelling slows the flow of liquid through the litter and provides for a longer retention time.

Figure 7:
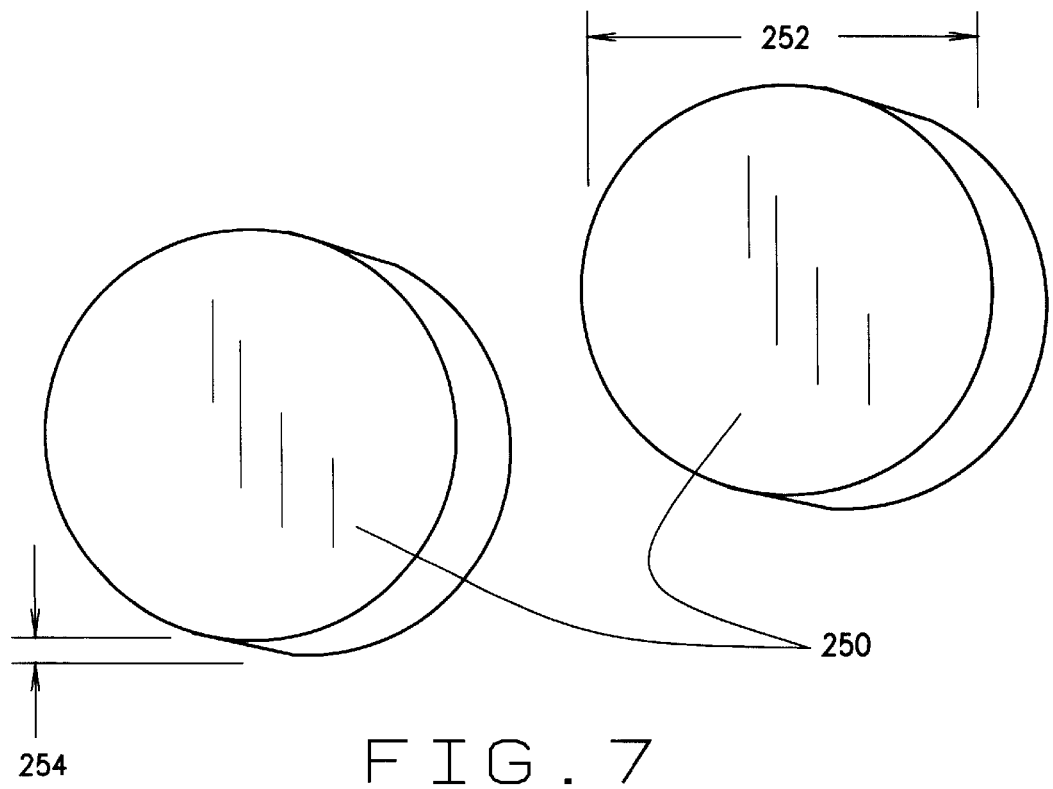
FIG. 7 is a perspective view of yet another embodiment of the animal litter.

FIG. 7 illustrates yet another alternative form of the dog litter. The dog litter is formed into discs 250 that have a substantially round shape. Discs 250 have a diameter 252 of about 1.0 inch to about 2.0 inches and a thickness 254 between about 0.125 inches and about 0.25 inches. Discs 250 are manufactured using a method similar to the method described above for the litter pellets.

In a further embodiment, the litter could be manufactured for use outdoors. For example, the litter could be manufactured out of wood chips that resemble bark chips from a tree.

In use, for example, a dog owner purchases the litter and spreads a layer of the litter in a suitable litter container, pan, or box. A suitable litter pan, for example, is made from a non-porous material such as plastic or metal. For dogs, the litter pan or box is about 6 inches high, and the size of the litter box or pan is chosen according to the size of the dog. For example, an oblong litter pan for a toy breed dog, weighing less than about 15 pounds, is about 24 inches long, and about 21 inches wide. Alternatively, for a dog of a larger breed, the litter pan is about 30 inches by about 24 inches. One side wall of the litter pan has a cut-out or opening, or is shorter than the remaining three side walls, to make entry into the pan easier for the dog.

Removal of soiled litter is accomplished with a scoop, shovel or rake, or some combination thereof, similar to those commonly used in cleaning cat litter pans. The scoop, shovel or rake is modified in size and shape to accommodate the size and shape of the litter pellets or flakes. Soiled litter may be disposed of in litter disposal bags made of a paper or plastic material and having a sealable closure.

The litter is well suited for traveling with pet dogs. It is believed that the high degree of odor control and absorbency provided by the combination of paper, sawdust and zeolite molecular sieve, plus the use of an olfactory cue scent, will facilitate the house training of puppies and dogs. In addition, the litter composition is relatively inexpensive and has the texture of soil. Further, the inclusion of sphagnum moss will make the litter composition even more absorbent.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An animal litter composition comprising:
   from about 30 to about 95 volume percent paper;
   from about 1 to about 50 volume percent sphagnum moss;
   from about 3 to about 50 volume percent sawdust; and
   from about 1 to about 10 volume percent zeolite molecular sieve.

2. The composition in accordance with claim 1 wherein said paper comprises recycled paper.

3. The composition in accordance with claim 1 further comprising about 0.05 lbs/ton to about 0.5 lbs/ton of an antimicrobial agent.

4. The composition in accordance with claim 3 wherein said antibacterial agent comprises Myacide.

5. The composition in accordance with claim 1 further comprising about 1.0 to about 2.0 weight percent bittering agent.

6. The composition in accordance with claim 5 wherein said bittering agent comprises quinine HCl.

7. The composition in accordance with claim 1 further comprising about 0.05 to about 0.3 weight percent fragrance.

8. The composition in accordance with claim 7 wherein said fragrance serves as an olfactory cue to dogs for urinating and defecating.

9. The composition in accordance with claim 7 wherein said fragrance comprises one of the group consisting of clover, spice, woods, earth, fresh outdoors, cut grass, and green grass.

10. The composition in accordance with claim 1 wherein said composition has a pelletized configuration.

11. The composition in accordance with claim 10 wherein said pelletized configuration has a cylindrical shape.

12. The composition in accordance with claim 10 wherein said pelletized configuration has a shape of an elongated cube.

13. The composition in accordance with claim 1 wherein said composition comprises:
   from about 45 to about 50 volume percent paper;
   from about 10 to about 40 volume percent sphagnum moss;
   from about 20 to about 35 volume percent sawdust; and
   from about 2 to about 5 volume percent zeolite molecular sieve.

14. An animal litter composition comprising:
   from about 40 to about 95 volume percent paper;
   from about 4 to about 50 volume percent sphagnum moss; and
   from about 1 to about 10 volume percent zeolite molecular sieve.

15. A composition in accordance with claim 14 wherein said paper comprises:
   from about 10 to about 99 volume percent recycled newspaper; and
   from about 1 to about 10 volume percent craft paper.

16. The composition in accordance with claim 14 further comprising about 0.05 lbs/ton to about 0.5 lbs/ton of an antimicrobial agent.

17. The composition in accordance with claim 16 wherein said antibacterial agent comprises Myacide.

18. The composition in accordance with claim 14 further comprising about 1.0 to about 2.0 weight percent bittering agent.

19. The composition in accordance with claim 18 wherein said bittering agent comprises quinine HCl.

20. The composition in accordance with claim 14 further comprising about 0.05 to about 0.3 weight percent fragrance.

21. The composition in accordance with claim 20 wherein said fragrance serves as an olfactory cue to dogs for urinating and defecating.

22. The composition in accordance with claim 20 wherein said fragrance comprises one of the group consisting of clover, spice, woods, earth, fresh outdoors, cut grass, and green grass.

* * * * *